United States Patent [19]

Hatcher

[11] 4,220,350
[45] Sep. 2, 1980

[54] TONGUE FOR CONNECTING A DRAFT IMPLEMENT TO A TOWING VEHICLE

[75] Inventor: John C. Hatcher, Charlotte, N.C.

[73] Assignee: Cole Manufacturing Company, Charlotte, N.C.

[21] Appl. No.: 1,734

[22] Filed: Jan. 8, 1979

[51] Int. Cl.² .............................................. B60D 1/16
[52] U.S. Cl. .................................. 280/656; 172/248; 280/460 A
[58] Field of Search ........... 280/415 R, 415 A, 456 R, 280/456 A, 460 R, 460 A, 474, 476 R, 493, 494; 172/248, 667, 677, 459, 484, 449, 443, 439; 111/62, 85, 52

[56] References Cited

U.S. PATENT DOCUMENTS

| 2,996,128 | 8/1961 | Gardner | 172/248 |
|---|---|---|---|
| 3,093,394 | 6/1963 | McCollum | 172/248 |
| 3,598,069 | 8/1971 | Hatcher | 111/85 |

*Primary Examiner*—John J. Love
*Assistant Examiner*—Randall A. Schrecengost
*Attorney, Agent, or Firm*—Bell, Seltzer, Park & Gibson

[57] ABSTRACT

A tongue for connecting a pull type implement to a towing vehicle is provided with a front end portion adapted to be detachably connected to the rear portion of a towing vehicle and a rear portion adapted to be pivotally connected to a lower front portion of the implement for movement about a substantially horizontal lateral axis, with an abutment fixedly supported by the frame and being positioned above the rear end portion of the frame, the abutment being adapted to abuttingly engage a corresponding upper front portion of the implement for limiting pivotal upward movement of the tongue relative to the implement and for permitting the abutment to swing forwardly away from the upper front portion of the implement to accommodate pivotal movement of the tongue relative to the implement incidental to downward movement of the towing vehicle relative to the implement and to unhitching of the implement.

7 Claims, 4 Drawing Figures

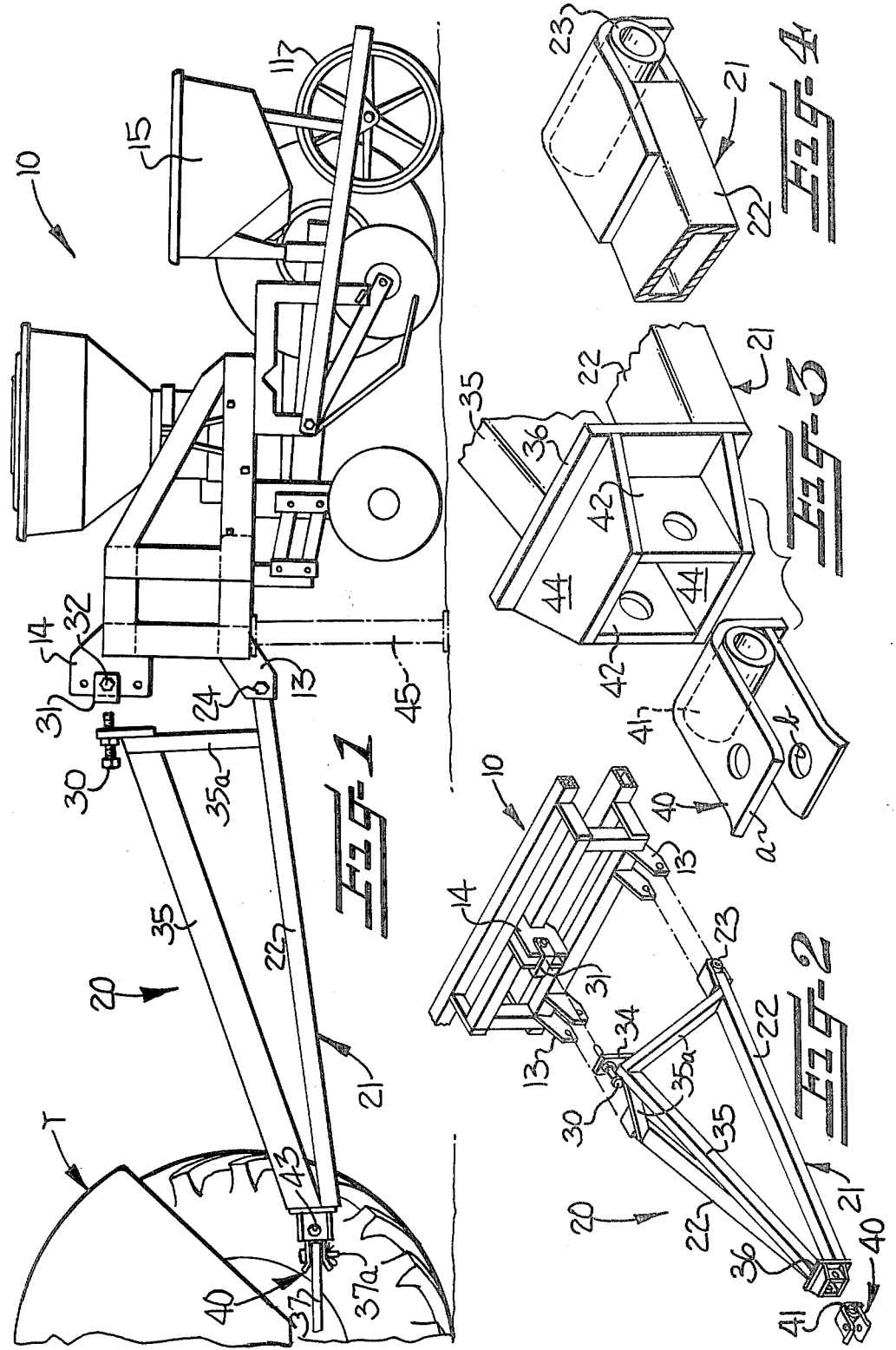

TONGUE FOR CONNECTING A DRAFT IMPLEMENT TO A TOWING VEHICLE

FIELD OF THE INVENTION

This invention relates to an improved tongue construction particularly useful for connecting agricultural or draft implements, such as earth working garden implements, seed planters and the like, to towing vehicles.

BACKGROUND OF THE INVENTION

It has become conventional in the use of agricultural tractors and the like to employ a type of towing connection, between such a tractor and an implement to be pulled by the tractor, known as a "three point" hitch. The industry related to such tractors and implements has standardized upon hitches of that general class, in which the connection between a towing vehicle and a towed implement is accomplished by a horizontally spaced apart pair of lower connecting points and a vertically spaced upper connecting point. By means of such a connection, an implement being towed may be raised and lowered or tilted as required to accommodate particular operations. An implement so used has been referred to as a "lift type" implement.

Another conventional type of towing connection uses a single connection point, as on a drawbar of a tractor or other towing vehicle, to transfer pulling force through a tongue to a "pull type" implement. Pull type implements are sometimes provided with controllable ground engaging lift wheels and oftentimes can exert unacceptably large tongue loads. More particularly, a rigid tongue assembly attached to the frame of a pull type implement cannot be easily hitched and unhitched from a towing vehicle where either an excessive downward or upward load is imposed on the tongue. Further, loads imposed during use of the implement may exceed the tongue strength and cause failure of the apparatus.

Persons using implements of the general types described have been known to attempt adaptation of a lift type implement to pull type practice by construction of a detachable tongue which connects with the connection points of a three-point hitch. While detachable tongues have heretofore been proposed for such use, difficulty is encountered where the detachable tongue connects with all three points of the conventional three point hitch. In such event, the connection between the implement and the towing vehicle is relatively rigid and the implement is subject to damage and breakage arising due to the exertion on the vehicle of inappropriate stresses. Alternatively, should the detachable tongue be constructed to cooperate with only two of the connection points of a conventional three point hitch, insufficient control is obtained over the attitude of the implement being towed, again exposing the implement to the risk of undesirable damage or breakage.

SUMMARY OF THE INVENTION

With the foregoing in mind, it is an object of this invention to provide an improved towing tongue of simple construction and which is adapted to be readily detachably connected between a pull type implement and a towing vehicle. Also, the tongue is so constructed that the front end of the draft implement may be tilted upwardly to a substantial extent relative to the essentially normal horizontal position of the tongue and the towing vehicle, but the tongue limits the downward tilting movement of the front end of the implement beyond a predetermined substantially horizontal plane relative to the tongue so that the implement then applies a downward force to the tongue which may be transmitted forwardly to the rear wheels of the towing vehicle. This construction additionally facilitates hitching and unhitching of the implement.

In its preferred embodiment according to the present invention, the improved tongue takes the form of an elongate frame having a front end portion adapted to be detachably connected to the rear portion of a towing vehicle and a rear end portion adapted to be pivotally connected to a lower front portion of an implement for movement about a substantially horizontal lateral axis. An abutment means is fixedly supported by the elongate frame so that it is positioned above the rear end portion of the frame. The abutment means is adapted to abuttingly engage a corresponding upper front portion of the implement for limiting pivotal upward movement of the tongue relative to the implement and for permitting the abutment means to swing forwardly away from the upper front portion of the implement in accommodation of pivotal downward movement of the tongue relative to the implement incidental to the downward movement of the towing vehicle relative to the draft implement or to an unhitching procedure.

BRIEF DESCRIPTION OF THE DRAWINGS

Some of the objects and advantages of the invention having been stated, others will appear as the description proceeds when taken in connection with the accompanying drawings, in which:

FIG. 1 is a side elevation of a preferred embodiment of the tongue of the present invention positioned between and interconnecting a pull type implement and a towing vehicle, and wherein the implement is shown in the form of a multi-row seed planter and the implement and tongue are arranged for hitching and unhitching;

FIG. 2 is a partially exploded perspective view of the improved tongue and implement of FIG. 1;

FIG. 3 is an enlarged, partially exploded, perspective view of the front end portion of the improved tongue; and FIG. 4 is an enlarged fragmentary perspective view of a tubular coupler member on a rear end portion of one of the side members of the tongue.

DETAILED DESCRIPTION

Referring more specifically to the drawings, the towing tongue of the present invention is illustrated in association with a typical agricultural or draft implement generally designated at 10. The implement may be of a type having a transverse main frame (Figure 2) and trailing ground wheels 11 supporting the same for travel over the ground, and a front portion of the implement may be provided with a conventional three point hitch thereon formed by a laterally spaced pair of lower coupling members 13 and an upper coupling member 14 spaced above and positioned intermediate the vertical planes of the lower coupling members 13. As illustrated, each coupling member 13, 14 is of bifurcated form, but it is to be understood that the coupling members may take other forms in different draft implements. The wheels 11 are mounted on trailing arms which extend rearwardly from the frame and which cooperate with hydraulic or pneumatic cylinders (not shown) for pivoting about a horizontal front axis. With such pivotal movement, the wheels serve to lift the frame to accommodate hitching and unhitching of the implement.

As is well known, during use of the implement as a lift type implement, a conventional three point hitch is attached to three-point liftarms of a conventional tractor or the like. The same general structure conveniently serves, in the present instance, to accommodate detachably connecting the rear end portion of the improved tongue to the front portion of the implement 10, as will be presently described. While the tongue 10 is adaptable to a wide variety of agricultural or draft implements, such as plows, fertilizer distributors, tillers and the like, the implement may be considered illustrative of a combined fertilizer spreader and seed planter having a lateral row of several seed planting units 15 on its rear portion. Since the seed planter may be of well-known construction, a detailed description thereof is deemed unnecessary, reference being made to Hatcher et al U.S. Pat. No. 3,598,069 for a disclosure of a typical seed planter.

Referring now to the improved towing tongue in detail, which tongue is broadly designated at 20, as indicated earlier herein the tongue comprises an elongate frame 21 having a front end portion adapted to be detachably connected to the rear portion of a towing vehicle such as is indicated at T in FIG. 1, and having a rear end portion adapted to be pivotally connected to the lower front portion of the implement 10 for movement about a substantially horizontal lateral axis, with abutment means being fixedly supported by the frame and positioned above the rear end portion of the frame. The abutment means is adapted to abuttingly engage a corresponding upper front portion of the implement for limiting pivotal upward movement of the tongue 20 relative to the implement 10 and for permitting the abutment means to swing forwardly away from the upper front portion of the implement 10 in accommodation of downward movement of the tongue 20 relative to the implement incidental to downward movement of the towing vehicle T relative to the implement 10.

Accordingly, as best illustrated in FIG. 2, it will be observed that the elongate frame 21 of the tongue 20 is generally triangular in plan and comprises a pair of forwardly converging elongate side frame members 22 having respective transverse tubular members 23 on their respective rear end portions (FIGS. 2 and 4). The transverse tubular members 23 may be welded or otherwise suitably secured to the rear end portions of the side frame members 22 in any desired manner, as illustrated in FIG. 4, for example. In order to pivotally connect the rear end portion of the tongue 20 to a lower front portion of the implement 10, pivot pin means 24, of any desired form, extend through the respective tubular members 23 and may also be removably attached to the respective lower coupling members 13 in any desired manner, as by extending through suitable holes provided in the bifurcations of the respective lower coupling members 13.

The aforementioned abutment means fixedly supported by the frame of tongue 20 is indicated at 30 in FIGS. 1 and 2 and positioned to extend above the rear end portion of the frame 21, and is arranged to engage a cooperating abutment means 31 on the upper coupling member 14 of the three point hitch on the front portion of the implement 10. The latter abutment means 31 may take the form of a substantially U-shaped or channel-shaped bracket straddling the bifurcations of the upper coupling member 14 and being suitably removably secured to the upper coupling member 14, as by means of a bolt 32 (FIG. 2).

It is preferred that at least one of the abutment means 30, 31 includes an adjustable abutment thereon for effecting a predetermined variable angular relationship between the frame 21 and the implement 10 when the adjustable abutment is abuttingly engaging the other of the abutment means. Accordingly, the abutment means 30 is shown in the form of an adjustment screw threadably penetrating an upstanding plate 34 welded or otherwise suitably secured to the rear end portion of an elongate inclined frame member 35 converging downwardly and forwardly with respect to the frame 21 and having its front end fixed with respect to the frame 21. The rear end portion of the inclined frame member may be supported in the desired spaced relation above frame 21 by means of a pair of diagonal brace members 35a welded thereto and having lower portions thereof welded to the respective side frame members 22 of frame 21. The proximal forward ends of the elongate frame members 22, 23 and 35 may be welded or otherwise suitably secured together and/or they may be welded or otherwise suitably secured to a substantially vertically disposed forward end plate 36 which carries suitable means for detachably connecting the front end portion of the tongue 10 to the rear portion of the towing vehicle T.

Since the rear end portions of many conventional towing vehicles used in the agricultural industry are equipped with a trailer hitch or other draw bar having a hole or holes therethrough for receiving therein a headed drop pin, such a bar 37 and corresponding drop pin 37a are shown on the rear end of the towing vehicle T in FIG. 1, and the front end portion of the frame 21 of tongue 10 may be provided with a one-point point hitch means thereon which may take substantially the form of a clevis 40 adapted to straddle the bar 37 with the drop pin 37a extending through the clevis. As shown in FIG. 3, the clevis 40 may comprise a pair of upper and lower plate members a having aligned holes b therethrough for loosely receiving the drop pin 37a therein. The rear portions of the upper and lower plate members a of clevis 40 are shown welded or otherwise suitably secured to the upper and lower surfaces of a transverse tubular member 41 adapted to be loosely positioned between a pair of upstanding laterally spaced plates 42 suitably secured to and extending forwardly from the upright plate 36 on the front end of the tongue 20. The plates 42 are adapted to receive therein a pivot pin 43 (FIG. 1) extending laterally of the tongue 10 and on which the tubular member 41 of clevis 40 is pivotally supported for movement about a substantially horizontal axis. The pivotal movement of the clevis 40 about the pivot pin 43 and relative to the tongue frame may be limited by a pair of upper and lower plate members 44 extending forwardly from and being suitably secured to the upright plate member 36, and being engaged by the upper and lower edges of the substantially upright side plates 42.

From the foregoing description, it can be appreciated that there is provided a towing tongue 10 for connecting an implement 20 to a towing vehicle T which tongue comprises an elongate frame, shown as being comprised of the two forwardly converging side frame members 22, and having a front end portion adapted by way of the clevis 40 to be detachably connected to the rear portion of the towing vehicle T. It can be appreciated that the rear end portion of the frame 21 of the tongue 20 also is adapted, via the tubular members 23 thereon and the respective pivot pin means 24, to be pivotally connected to a lower front portion of the implement 10 for movement about a substantial horizontal lateral axis. It can be seen further that abutment means 30 is provided which is fixedly supported by the frame 21 and is positioned to extend above the rear end portion of the frame, and that cooperating abutment means 31 is provided on the upper coupling member 14 of the implement 10 so as to be engageable by the abutment means 30 for limiting pivotal upward movement of the tongue 20 relative to the draft implement 10 and for permitting the abutment means 30 to swing forwardly away from the cooperating abutment means in accommodation of pivotal downward movement of the tongue 20 relative to the draft implement 10.

The tongue of this invention facilitates single person hitching and unhitching by particular cooperation with the ground wheels 11 and a suitable prop or strut 45 (FIG. 1) which is used to support the implement when it is not in active use. More particularly, the wheels 11 are used to raise the implement relative to the ground and permit insertion of the prop or strut 45 beneath the implement frame. When the implement is then lowered, the strut serves as a fulcrum or pivot, opening the tongue (as shown) and releasing from the towing vehicle T drawbar any weight in excess of tongue structure weight. Thus, the only weight to be handled by an operator hitching or unhitching the pull type implement is the tongue weight alone.

In the drawings and specification there has been set forth a preferred embodiment of the invention and, although specific terms are employed, they are used in a generic and descriptive sense only and not for purposes of limitation.

That which is claimed is:

1. A tongue for connecting a draft implement to a towing vehicle, said tongue comprising an elongate frame having a front end portion adapted to be detachably connected to the rear portion of a towing vehicle and a rear end portion adapted to be pivotally connected to a lower front portion of the draft implement for movement about a substantially horizontal lateral axis, and abutment means fixedly supported by said frame and being positioned above said rear end portion of said frame, said abutment means being joined with said frame by an elongate frame member converging downwardly and with respect to said frame and having its front end fixed with respect to said frame, said abutment means being attached to the rear end of said frame member and adapted to abuttingly engage a corresponding upper front portion of the draft implement for limiting pivotal upward movement of said tongue relative to the draft implement and for permitting said abutment means to swing forwardly away from said upper front portion of the draft implement in accommodation of pivotal downward movement of said tongue relative to the draft implement incidental to downward movement of the towing vehicle relative to the draft implement.

2. A tongue according to claim 1 wherein said frame comprises a pair of forwardly converging elongate frame members having respective transverse tubular members on their respective rear end portions, said lower front portion of the draft implement being provided with a pair of laterally spaced forwardly extending coupling members thereon, and pivot pin means extending through said tubular members and being attached to said coupling members for pivotally connecting said rear end portion of said frame to said lower front portion of the draft implement.

3. A tongue for connecting a draft implement to a towing vehicle, said tongue comprising an elongate frame having a front end portion adapted to be detachably connected to the rear portion of a towing vehicle and a rear end portion adapted to be pivotally connected to a lower front portion of the draft implement for movement about a substantially horizontal lateral axis, and abutment means fixedly supported by said frame and being positioned above said rear end portion of said frame, said abutment means being adapted to abuttingly engage a corresponding upper front portion of the draft implement for limiting pivotal upward movement of said tongue relative to the draft implement and for permitting said abutment means to swing forwardly away from said upper front portion of the draft implement in accommodation of pivotal downward movement of said tongue relative to the draft implement incidental to downward movement of the towing vehicle relative to the draft implement, and means adjustable forwardly and rearwardly relative to said frame for effecting a predetermined angular relationship between said frame and the draft implement when said abutment means abuttingly engages said upper front portion of the draft implement.

4. A tongue for connecting to a towing vehicle a draft implement of a type having a front portion including a conventional three point hitch formed by a laterally spaced pair of lower coupling members and an upper coupling member spaced above and positioned intermediate the vertical planes of the lower coupling members, said tongue comprising an elongate frame having a front end portion adapted to be detachably connected to the rear portion of a towing vehicle, said frame also having a rear end portion adapted to be pivotally connected to the laterally spaced lower coupling members of the draft implement for movement about a substantially horizontal lateral axis, abutment means fixedly supported by said frame and being positioned to extend above said rear end portion of said frame, and cooperating abutment means on said upper coupling member and being engageable by said first-named abutment means for limiting pivotal upward movement of said tongue relative to the draft implement and for permitting said first-named abutment means to swing forwardly away from said cooperating abutment means in accommodation of pivotal downward movement of said tongue relative to the draft implement incidental to downward movement of the towing vehicle relative to the draft implement.

5. A tongue according to claim 4 wherein at least one of said abutment means includes an adjustable abutment thereon for effecting a predetermined variable angular relationship between said frame and said draft implement when said adjustable abutment is abuttingly engaging the other of said abutment means.

6. A tongue according to claim 4 wherein said first-named abutment means is fixedly supported by said frame by means of an elongate frame member converging downwardly and forwardly with respect to said frame and having its front end fixed with respect to said frame, and said first-named abutment means being attached to the rear end of said frame member.

7. A tongue according to claim 4 wherein said elongate frame comprises a pair of forwardly converging elongate frame members having respective transverse tubular members on their respective rear end portions and pivot pin means extending through said tubular members and being attached to the respective lower coupling members for pivotally connecting said rear end portion of said frame to said front portion of the draft implement.

* * * * *